May 11, 1965     J. R. WAITE     3,182,635

BIRD FEEDER

Filed May 17, 1963

INVENTOR
James R. Waite

BY Olive H. Bramson

ATTORNEY

United States Patent Office 3,182,635
Patented May 11, 1965

3,182,635
BIRD FEEDER
James R. Waite, 95 N. Woods Road, Flower Hill,
Manhasset, N.Y.
Filed May 17, 1963, Ser. No. 281,196
5 Claims. (Cl. 119—51)

This invention relates generally to bird feeding apparatus and more particularly to a device adapted for outdoor use, spillage of the contents thereof being precluded notwithstanding the mobile installation arrangement disclosed herein.

Whereas conventional bird feeders hung from the limbs of trees and exposed to the natural elements and wild life are easily tipped and the bird feed spilled therefrom, it has become desirable to create a feeder impervious to these ever present hazards and thereby benefit the birds by preserving the contents for their exclusive consumption.

Consonant with the foregoing, the instant invention has for an object the provision of a bird feeder incapable of being tipped in the direction of the bird access opening thereof either by animals such as squirrels and the like or by extreme winds.

Another object of the present invention is to provide a device of the instant character capable of being freely hung in a mobile manner, i.e., rotatable about the vertical axis.

A further object of this invention resides in the provision of a bird feeder having a flange type shelf therearound whereupon birds may perch while the stability of the feeder is maintained with respect to the preclusion of spilling the contents thereof.

Another general object of the present invention is to provide a device of the described character which will be simple in structure, economical of manufacture, easily and quickly installed and highly effective in use.

Other objects and advantages of the instant bird feeder will be set forth in part hereinafter and in part will be obvious herefrom, or may be learned by practice of the invention, the same being realized and attained by means of the structure defined and pointed out in the appended claims.

The accompanying drawings referred to herein and constituting a part hereof, illustrate one embodiment of the invention, and together with the description, serve to explain the principles of the invention.

Figure 1:
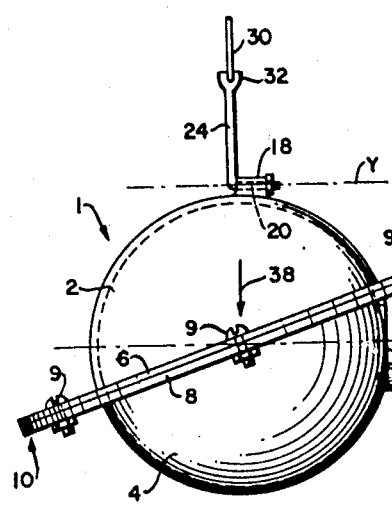
FIGURE 1 is a side view of the bird feeder in accordance with the present invention.
Figure 2:
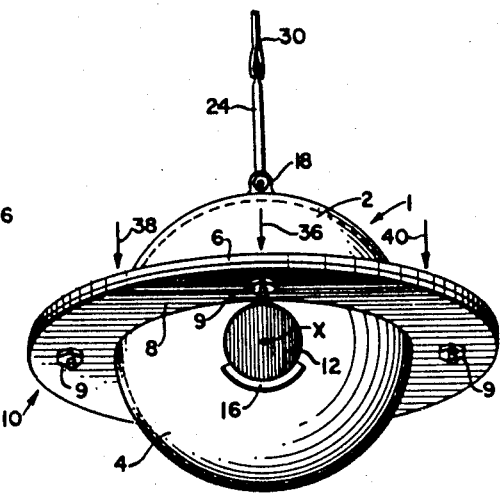
FIGURE 2 is a front view thereof.
Figure 3:
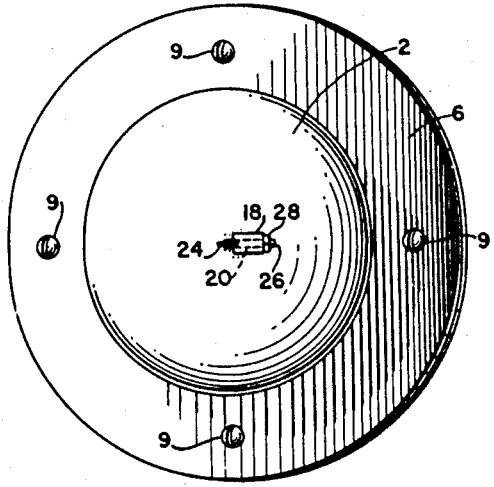
FIGURE 3 is a top plan view of the device.

Referring now in detail to the present preferred embodiment of the invention illustrated in the accompanying drawings, FIGURES 1, 2 and 3 show the bird feeder designated generally by numeral 1, said views being side and front illustrations respectively. As seen therein, the instant invention is preferably formed of a spherically shaped hollow container adapted to hold bird seed internally thereof, said container being formed of upper and lower hemispheric sections 2 and 4, respectively, flanges 6 and 8 being integrally positioned circumferentially of the edge of each said hemispheric section, respectively. Accordingly, upon combining said sections with e.g., nut and screw fasteners 9 to form said spherically shaped hollow container, said flanges 6 and 8 are superposed to form a united flange portion designated generally by numeral 10, said flange portion being disposed externally of said container and peripherally of the juncture of said upper and lower hemispheric sections.

Figure 6:
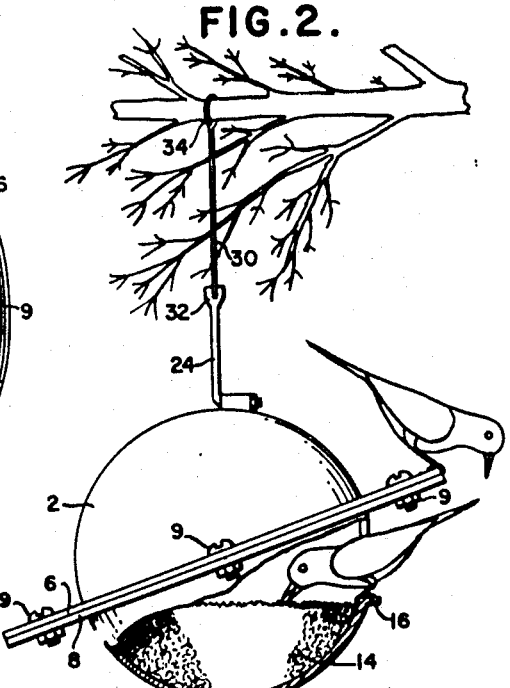
FIGURE 6 is a view of the bird feeder installed and hanging from the limb of a tree.

Circular opening 12, positioned through the wall of said lower hemispheric section 4, provides access to bird seed 14 as shown in FIGURE 6, perch 16 being further provided as a bird landing to facilitate seed removal. Axial $x$ shown in FIGURE 1 and included for reference purposes only is seen to be concentric with respect to the circular opening 12.

Projection 18 which is integral with the upper hemispheric section 2 extends externally of the wall thereof and is provided with linear passage 20 therethrough, longitudinal axis $y$ of said passage being illustrated in FIGURE 1 of the drawing for reference purposes, said longitudinal axis being disposed substantially parallel to and in the same vertical plane as the concentric axis $x$ of said circular opening.

Figures 4, 5:
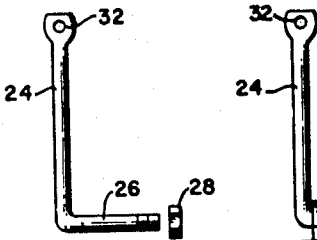
FIGURE 4 is an isolated enlarged view of the rigid L-shaped rod and fastening means.
FIGURE 5 is an isolated enlarged view of the rigid L-shaped rod disposed within the projection on top of the bird feeder.

With reference now to FIGURES 4 and 5, the L-shaped rod, disclosed therein and generally designated by numeral 22 is seen to comprise long and short legs 24 and 26, respectively, said short leg 26 being slidably receivable within said linear passage 20 and rotatably retained therein by nut 28 or other suitable means, e.g., enlarging or bending the free end of short leg 26.

As aforementioned, the present bird feeder, when hung from the limb of a tree will rotate freely in a horizontal plane by dint of the mobile-like swivel action permitted by flexible line 30 attached to said long leg 24 at loop 32 thereof, and other end of said line 30 being secured to a tree limb at 34 as shown in FIGURE 6 of the drawings. As will be further observed by referring to the drawings, the long leg 24 forms the vertical axis of the spherically shaped hollow container and the aforedescribed flange portion lies in a sloping plane making an acute angle with said vertical axis on the side of the container having opening 12, said flange extending above said opening.

By reason of the foregoing construction, it will be appreciated that a downward force exerted upon said bird feeder at the region designated by arrow 36 will fail to tip said feeder, thus precluding spillage of seed from opening 12. Forces designated by arrows 38 and 40, will however, cause pivoting of said bird feeder about said short leg 26 of the rigid L-shaped rod and thus concentrically with respect to said longitudinal axis $y$ of said linear passage 20. Such movement is desirable and purposeful in alleviating strains occasioned by such forces 38 and 40 and to eliminate a stable surface for supporting relatively heavy animals which may damage the bird feeder and/or permit such animals to gain access to the contents thereof.

Thus, the device will support small birds as shown in FIGURE 6 without consequent tipping and spillage of bird seed 14 contained therein, leaving the contents free of the intrusion of animals.

Although the preferred embodiment of the bird feeder structure has been described, it will be understood that within the purview of this invention various changes may be made in the forms, details, proportion and arrangement of parts, the combination thereof and mode of operation, which generally stated consist in a device capable of carrying out the objects set forth, as disclosed and defined in the appended claims.

What is claimed is:

1. In a bird feeder, the combination comprising a hollow spherical container adapted to hold bird seed internally thereof, said container having a circular opening through the wall thereof, a rigid projection extending externally and integrally of the wall of said container, said projection having a linear passage therethrough, the longitudinal axis of said linear passage being substantially parallel with respect to the concentric axis of said opening, a rigid L-shaped rod having a relatively long and short leg, said short leg being rotatably retained within said linear passage to permit pivoting of said container with respect to said rod, and a flexible line attached to the end of said long leg, the long leg of said rod forming a vertical axis and a flat circular flange secured to said container and extending outwardly therefrom, said flange lying in a sloping plane making an acute angle with the vertical axis of the rod on the side of the container having said opening and said flange extending above the opening.

2. In a bird feeder, the combination comprising a spherically shaped hollow container adapted to hold bird seed internally thereof, said container being formed of upper and lower hemispheric sections, said lower hemispheric section having a circular opening through the wall thereof, a projection extending externally of the wall of said upper section, said projection being fixed with respect to the wall of said upper section, said projection having a linear passage therethrough, a rigid rod having a relatively long and short leg, said short leg being rotatably retained within said linear passage to permit pivoting of said rod and a flexible line attached to the end of said long leg, said rod forming a vertical axis and a flat circular flange secured to said container and extending outwardly therefrom, said flange lying in a sloping plane making an acute angle with the vertical axis of the rod on the side of the container having said opening and said flange extending above the opening.

3. In a bird feeder, the combination comprising a hollow spherical container adapted to hold bird seed internally thereof, said container having an opening through the wall thereof, a rigid projection extending externally and integrally of the wall of said container, a rigid rod having one end thereof pivotally connected to said projection, and a flexible line attached to the other end of said rigid rod, said rod forming a vertical axis and a flat circular flange secured to said container and extending outwardly therefrom, said flange lying in a sloping plane making an acute angle with the vertical axis of the rod on the side of the container having said opening and said flange extending above the opening.

4. In a bird feeder, the combination comprising a spherically shaped hollow container adapted to hold bird seed internally thereof, said container being formed of upper and lower hemispheric sections, a flat circular flange portion disposed externally of said container and peripherally of the juncture of said upper and lower hemispheric sections, said lower hemispheric section having a circular opening through the wall thereof, a rigid projection extending externally and integrally of the wall of said upper section, said projection having a linear passage therethrough, the longitudinal axis of said linear passage being disposed substantially parallel with respect to the concentric axis of said circular opening, a rigid L-shaped rod having a relatively long and short leg, said short leg being rotatably retained within said linear passage to permit pivoting of said container with respect to said rod, and a flexible line attached to the end of said long leg, said rod forming a vertical axis, and said flat circular flange portion secured to said container and extending outwardly therefrom, said flange lying in a sloping plane making an acute angle with the vertical axis of the rod on the side of the container having said opening and said flange extending above the opening.

5. In a bird feeder, the combination comprising a hollow spherical container adapted to hold bird seed internally thereof, said container having a circular opening through the wall thereof, a rigid projection extending externally of the wall of said container, said projection being fixed with respect to the wall of said container, said projection having a linear passage therethrough, the longitudinal axis of said linear passage being substantially parallel with respect to the concentric axis of said opening, a rod pivotally connected to said projection, said rod forming a vertical axis of said container and a flat circular flange secured to said container and extending outwardly therefrom, said flange lying in a sloping plane making an acute angle with the vertical axis of the rod on the side of the container having said opening and said flange extending above the opening.

References Cited by the Examiner
UNITED STATES PATENTS

| 2,260,018 | 10/41 | Garthus | 119—23 |
| 2,634,705 | 4/53 | Mayes | 119—51 |
| 2,887,987 | 5/59 | Fitzgerald et al. | 119—23 |

FOREIGN PATENTS 296,944   5/54   Switzerland.

SAMUEL KOREN, Primary Examiner.

HUGH R. CHAMBLEE, Examiner.